March 19, 1968     M. LADNEY, JR     3,373,460
MOLDING APPARATUS

Filed Sept. 13, 1965     5 Sheets-Sheet 1

INVENTOR.
MICHAEL LADNEY, JR.
BY
ATTORNEYS

INVENTOR.
MICHAEL LADNEY, JR.
BY
Barnes, Kisselle, Raisch & Choate
ATTORNEYS

INVENTOR.
MICHAEL LADNEY, JR.
BY
Barnes, Kisselle, Raisch & Choate
ATTORNEYS

United States Patent Office 3,373,460
Patented Mar. 19, 1968

3,373,460
MOLDING APPARATUS
Michael Ladney, Jr., Grosse Pointe Shores, Mich.
(18125 E. 10 Mile Road, East Detroit, Mich. 48021)
Filed Sept. 13, 1965, Ser. No. 486,777
4 Claims. (Cl. 18—42)

ABSTRACT OF THE DISCLOSURE

A plastic molding die wherein the male die member comprises a center core and two side cores slidably connected with the center core and including a support member having a pair of inclined support faces engaged by the side cores for constraining the side cores to move in a path of travel inclined to and in the direction of the path of travel of the center core when retracted.

---

This invention relates generally to molding apparatus and in particular to an apparatus for molding articles from plastic material.

A designer of molded plastic articles, particularly hollow articles, must take into consideration the capabilities and limitations of the apparatus to be used for molding the article. In general, the simpler the shape of the article, the easier it is to mold. In some cases, however, it is desirable for styling or functional reasons to have irregular surfaces on the article which cannot be molded using conventional apparatus. For example, an article whose sides are closed or bridged at one end and slope inwardly from that end to a mouth at the other end has been difficult to mold because of the difficulty of removing the article from the mold section which defines the article's inner surface.

It is an object of this invention to provide apparatus capable of molding articles of the type having side walls which slope inwardly toward the open side of the article.

Another object of the invention is to provide molding dies which can be withdrawn from irregularly shaped hollow articles after molding them.

Another object of the invention is to provide multi-part molding dies with mechanism for moving different die parts in different directions when opening and closing the dies.

A further object of the invention is to provide a self-constricting molding die in apparatus for molding hollow articles.

Figure 1:
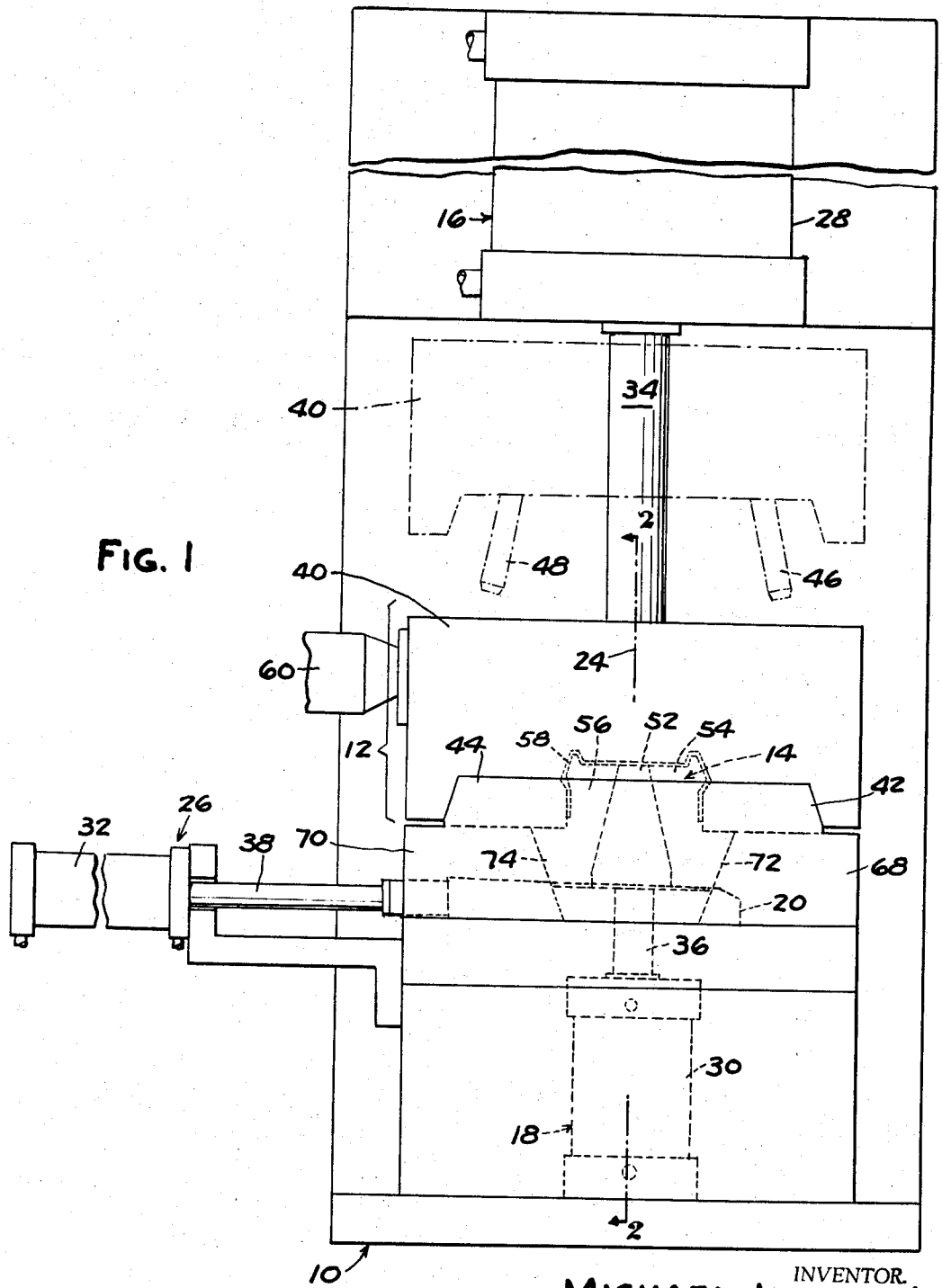
FIG. 1 is an elevational view of a molding apparatus in accordance with the invention.
Figure 2:
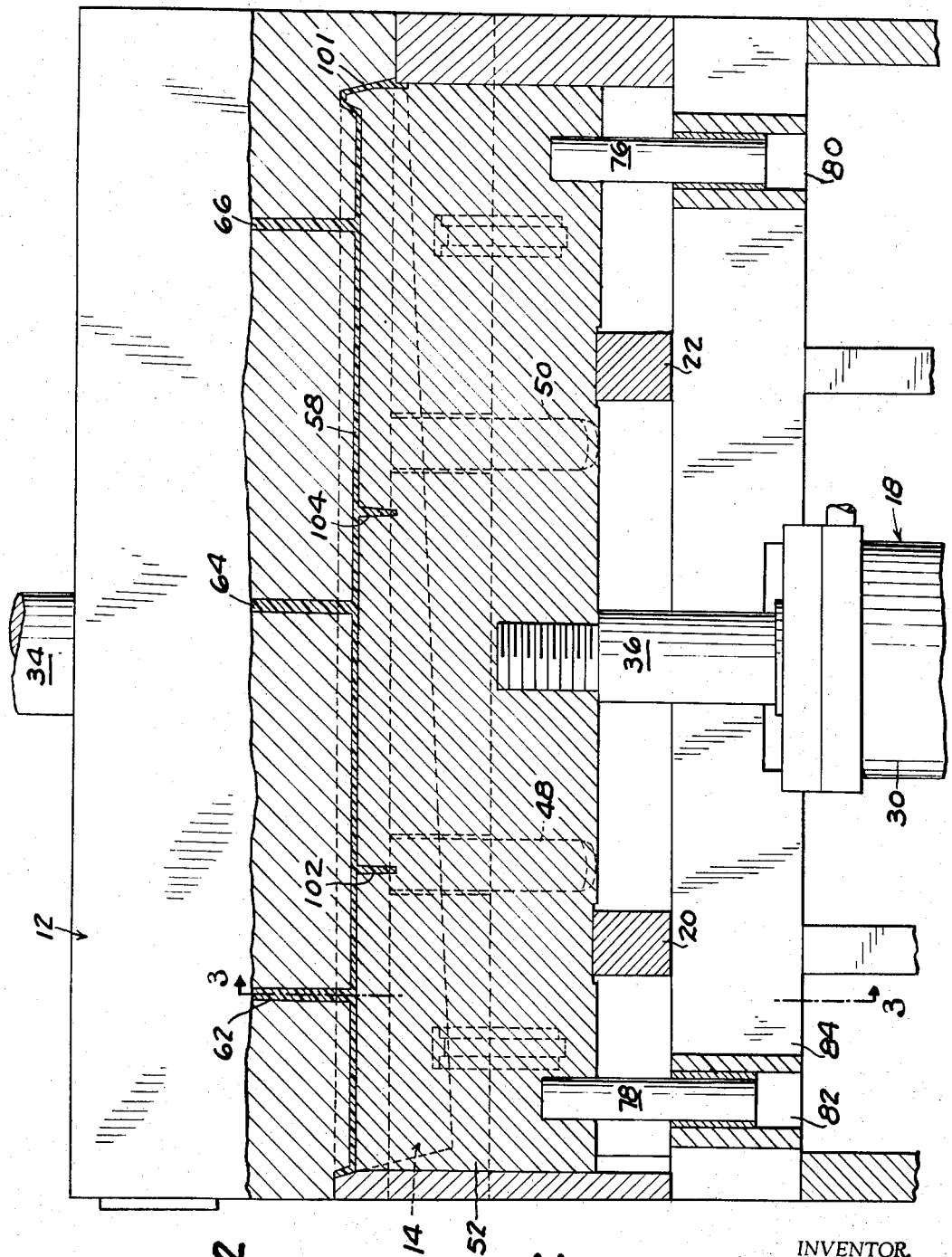
FIG. 2 is a section taken on line 2—2 of FIG. 1.
Figure 3:
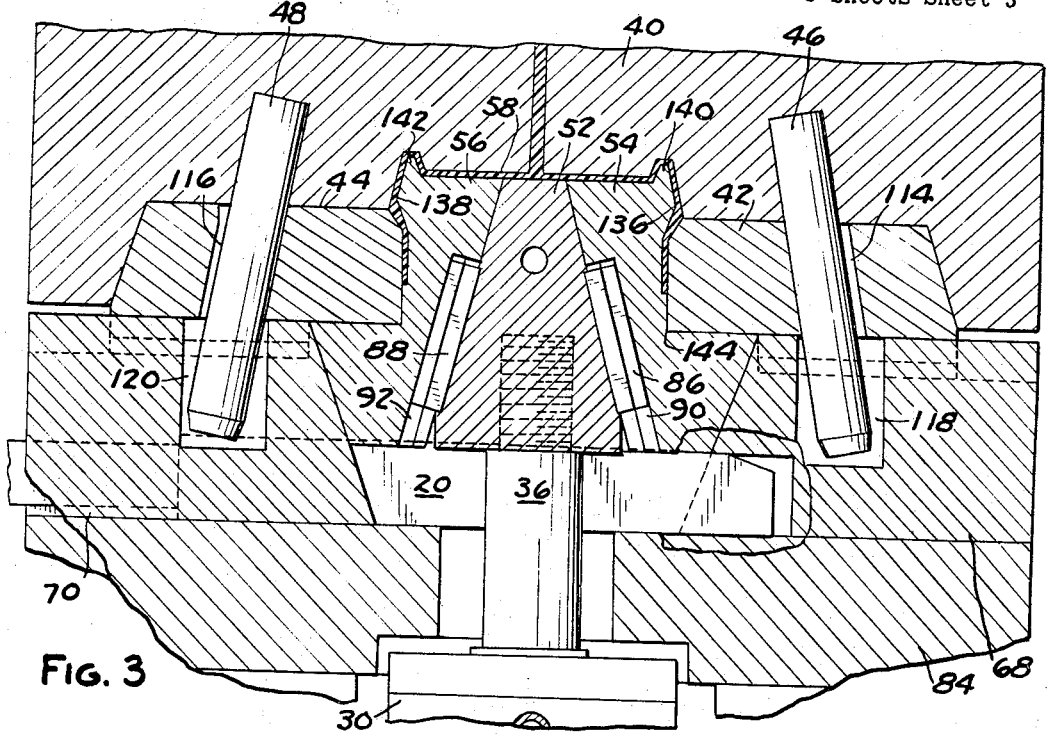
FIG. 3 is a section taken on line 3—3 of FIG. 2, showing upper and lower mold sections in a closed condition.
Figure 4:
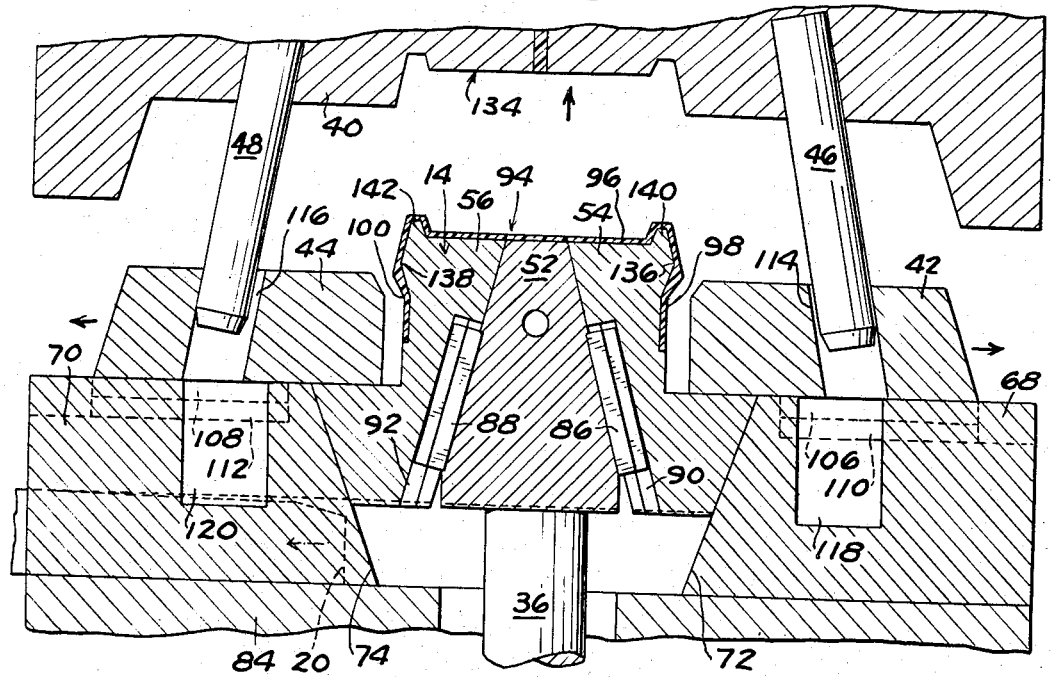
FIG. 4 is the same section as FIG. 3 but showing the upper mold section raised from the lower mold section.

Referring first to FIGS. 1 and 2, molding press 10 includes an upper mold section 12, a lower mold section 14 and hydraulic rams 16 and 18 for opening and closing the mold sections. Two lock slides 20 and 22 in the form of wedge bars are located just below lower mold section 14 and are movable transversely of the vertical axis 24 of the apparatus by a third hydraulic ram 26. Hydraulic rams 16, 18 and 26 are conventional, and respectively include cylinders 28, 30 and 32, and pistons 34, 36 and 38. Upper mold section 12 consists of a vertically movable die 40 and lower mold section 14 includes two transversely movable members 42 and 44. By operation of hydraulic ram 16, molding die 40 may be raised upward to the position shown with broken lines in FIG. 1, and two cam pins 46 and 48 are shown projecting downward from the bottom of molding die 40 in its raised or open position. There are two more such cam pins behind pins 46 and 48, and one of the rear cam pins 50 is shown with dashed lines in FIG. 2. The cam pins serve to move mold members 42 and 44 laterally away from each other as molding die 40 is raised as shown in FIGS. 3 and 4.

Lower mold section 14 also includes a central core 52 and two side cores 54 and 56 on opposite sides of the central core. Only the closed position of lower mold section 14 is indicated in FIG. 1, but its self-constricting movement to an open position will be described later in connection with FIGS. 3, 4 and 5. Central core 52 and sides cores 54 and 56 contact wedge bars 20 and 22 at their bottom faces, and the wedge bars must be withdrawn to the left (FIG. 1) by operation of hydraulic ram 26 before lower mold section 14 can be moved to open position. Conversely, wedge bars 20 and 22 are moved to the right in the final stage of closing the mold sections, and the wedge bars are tapered at their leading ends as illustrated so as to wedge lower mold section 14 upward to its final closed position. With both mold sections in closed positions they define a mold cavity 58 between them in the shape of the hollow article to be molded.

Fluid plastic material is injected into mold cavity 58 through an injector 60 shown partially at the side of apparatus 10 in FIG. 1.

In FIG. 2, gates 62, 64 and 66 which lead to mold cavity 58 from injector 60 are visible, and in this view mold cavity 58 is filled with plastic material.

On either side of lower mold section 14 (FIG. 1) there are stationary guide blocks 68 and 70 which have slanting surfaces 72 and 74 for guiding side cores 54 and 56 to their open positions when the mold sections are opened. Central core 52 is guided vertically by posts 76 and 78 piloted in bores 80, 82 in a platform 84 and secured to the underside of core 52. Piston 36 of hydraulic ram 18 is connected to central core 52 of lower mold section 14 and the central core in turn is coupled to side cores 54 and 56 by means of keys 86, 88 and keyways 90, 92 (FIGS. 3–5 and 7).

The molded plastic article illustrated is in the form of a panel 94 that is hollow, having a top wall 96, two side walls 98 and 100 and an end wall 101. Stiffening ribs 102 and 104 run transversely on the underside of top wall 96 (FIG. 2).

After a panel 94 has been molded in the apparatus (FIG. 3), mold sections 12 and 14 can be opened. Wedge bars 20, 22 are pulled out from under lower mold section 14 by operation of hydraulic ram 26. Vertically movable molding die 40 is raised (FIG. 4) by operation of hydraulic ram 16, and in moving upward its slanted cam pins 46, 48 push laterally movable members 42 and 44 in opposite directions away from panel 94. Members 42 and 44 are slidably connected to guide blocks 68 and 70, respectively, by keys 106, 108 and keyways 110, 112 (FIG. 4). Cam pins 46, 48 extend through openings 114, 116 in members 42, 44 into openings 118, 120 in guide blocks 68, 70 in the closed position, and are withdrawn from the latter openings when molding die 40 is raised.

Figure 5:
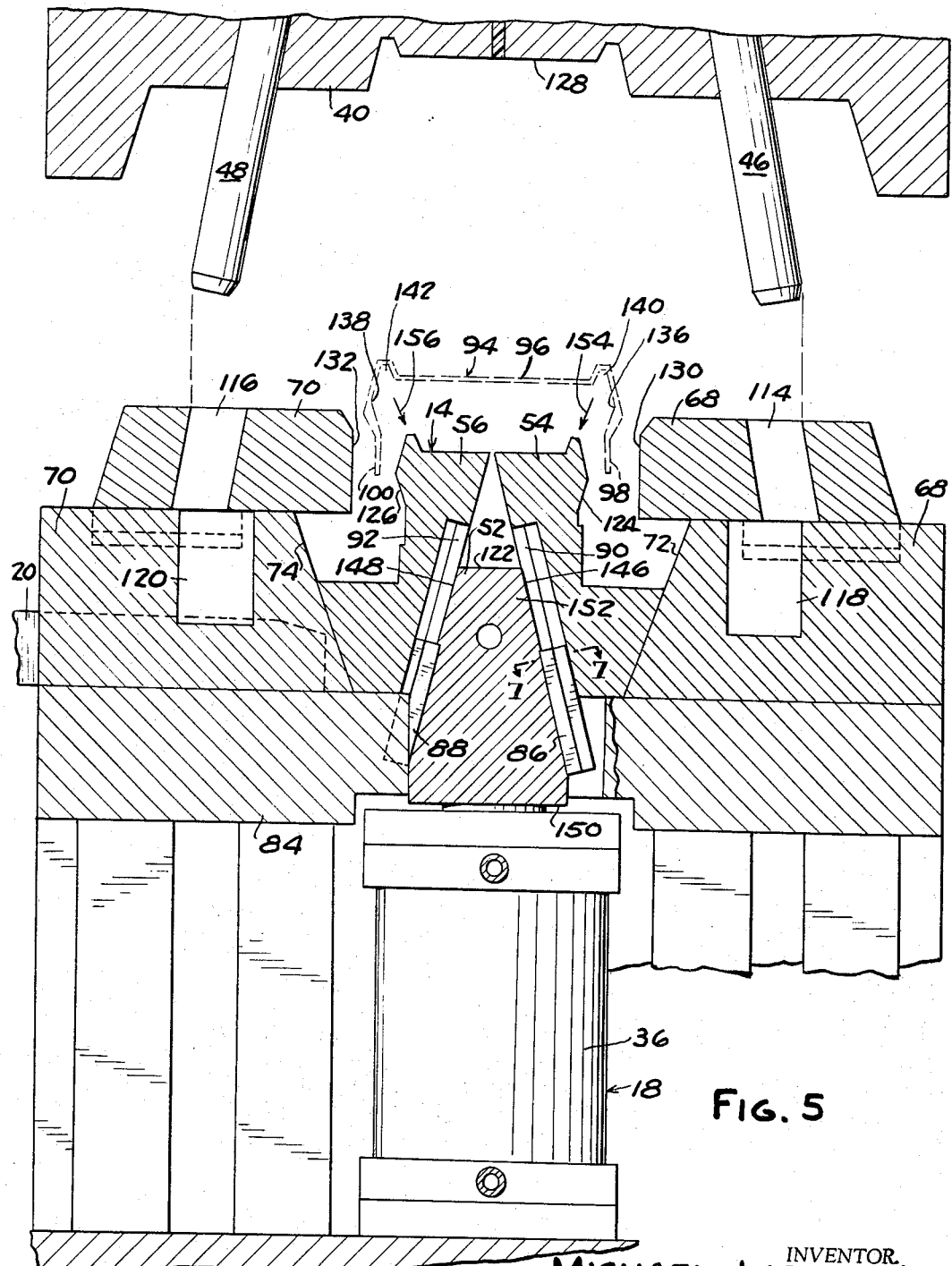
FIG. 5 is another section similar to FIGS. 3 and 4 which illustrates how three movable members of the lower mold section move in different directions in a self-constricting manner to release the molded plastic article.

Panel 94 remains on lower mold section 14 while molding die 40 is being raised. The outer surfaces 122, 124 and 126 of members 52, 54 and 56 define the inside configuration of panel 94, and surfaces 128, 130, 132 of members 40, 42, 44 define the panel's outside configuration (see FIG. 5). The latter surfaces form a main recess 134 in upper mold section 14 in the closed position of that mold section. It may be noted that the inside and outside configurations of panel 94 inversely match each other, but this is not essential. The inside surfaces of said walls 98 and 100 of panel 94 have lateral recesses 136 and 138 and top wall 96 has longitudinal recesses 140 and 142. Since side cores 54, 56 of lower mold section 14 extend into lateral recesses 136, 138, the side members cannot be withdrawn straight downward out of the molded article. They cannot be moved inward horizontally because they extend into recesses 140, 142. Accordingly, a self-constricting construction has been provided for lower mold section 14, and its operation is illustrated in FIG. 5.

Hydraulic ram 18 moves central core 52 of lower mold section 14 downward in a straight line path away from the upper mold section. Central core 52 is in the shape of a wedge and has side surfaces 146 and 148 tapering toward each other from end 150 to tip 152. Side surfaces 146, 148 are in sliding contact with side members 54, 56 and central core 52 is keyed to side members 54 and 56 so as to allow this relative sliding movement.

As central core 52 moves downward, it pulls side members 54 and 56 downward and toward each other at the same time. Blocks 68 and 70 guide the movement of side cores 54 and 56 along paths 154 and 156 which are oblique relative to the path of central core 52. Guide blocks 68 and 70 have surfaces 72 and 74 which slant and are parallel to the respective paths 154, 156 of side cores 54 and 56. Surfaces 72 and 74 slant obliquely relative to the tapering sides 146, 148 of central core 52. The slanting surfaces 72, 74 form ramps down which side cores 54 and 56 slide when they are moved to open position by operation of hydraulic ram 18.

To close the mold sections the sequence of operation is simply the reverse of the opening sequence. Thus, as central core 52 moves upward it pushes side cores 54 and 56 up ramps 72 and 74 while moving between the side cores to the position shown in FIG. 4. Lock slides 20, 22 are pushed under cores 52, 54, 56 and cause them to move to the fully closed position. Vertically movable molding die 40 is lowered and cam pins 46 and 48 shift members 68 and 70 inwardly until the mold sections are fully closed as shown in FIG. 3. The plastic material is injected into mold cavity 58 and a panel 94 is molded in the cavity to complete the cycle of operation.

Figure 6:
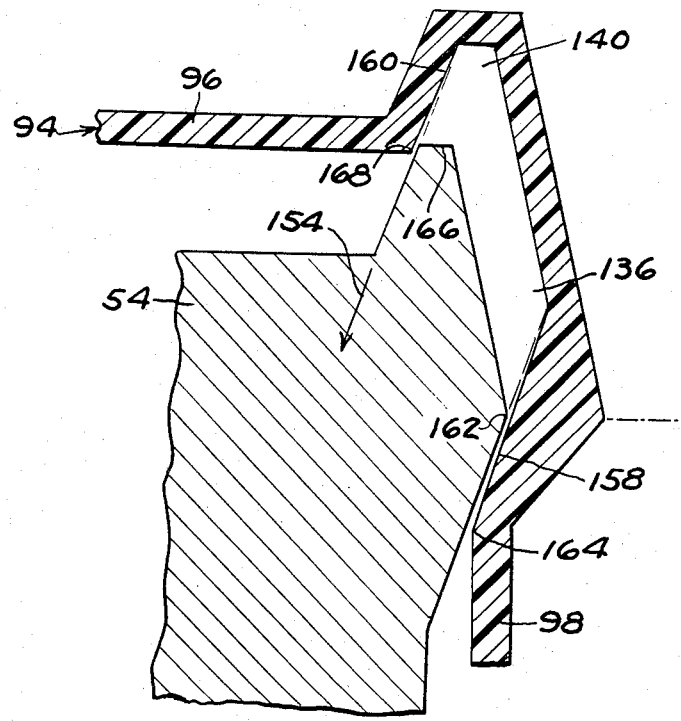
FIG. 6 is a detail section of one corner of the molded plastic article and the corresponding corner of the lower mold section showing how the mold moves out of that corner of the article.
Figure 7:
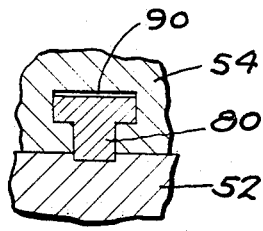
FIG. 7 is a detail section taken on line 7—7 of FIG. 5, which illustrates one of the key-type connections between a central member and side members of the lower mold section.

FIG. 6 is a greatly enlarged section of one corner of panel 94 and illustrates the manner in which one side core 54 moves out of the lateral and longitudinal recesses 136, 140. Slanting surfaces 158 and 160 of the panel 94 taper away from each other slightly in the direction of arrow 154, which indicates the path followed by side member 54. Surfaces 158 and 160 could be parallel, but a slight taper as shown makes it easier to withdraw the side member. Side member 54 is withdrawn far enough so that its laterally projecting corner 162 clears corner 164 of panel 94 in the vertical direction and so that its longitudinally projecting tip 166 clears corner 168 of panel 94 in the horizontal direction. Panel 94 may then be readily removed from the lower mold section 14.

The invention makes it practical to mold irregularly shaped hollow articles. The self-constricting molding die of the apparatus can be adapted to a variety of configurations, and its utility is not limited to the molding of articles specifically of the type shown and described herein. Although the invention is particularly useful in plastic molding, it can be applied to other molding processes and materials.

I claim:

1. A mold comprising male and female die members which when closed define a cavity therebetwen conforming to the workpieces to be molded, one of said die members comprising a pair of adjacently positioned cores, means for retracting one of said cores from the molded workpiece in a rectilinear path, said other core having a pair of spaced-apart surfaces thereon defining said cavity in part and shaped such as to require retraction of said other core from the molded part along a rectilinear path inclined at an acute angle to the retraction path of travel of said one core, the adjacent faces of said two cores being slidably interconnected for movement in unison such that when said one core is retracted along said rectilinear path the other core shifts transversely of said path, a support member positioned adjacent said other core and having a guide surface thereon inclined at said acute angle to said retraction path of travel of said one core, said other core having a surface portion slidably engaging said guide surface such that when said one core is retracted along said rectilinear path said other core is constrained by the guide surface of said support member to retract along a path of travel disposed at said acute angle to the retraction path of travel of said one core.

2. A mold as set forth in claim 1 wherein said spaced-apart surfaces on said other core are shaped such as to require retraction of said other core along a rectilinear path inclined at an acute angle toward and in the direction of the retraction path of travel of said one core.

3. A mold as called for in claim 2 wherein said spaced-apart surfaces are inclined to the retraction path of travel of said one core and extend toward the path of travel of said one core in non-converging relation.

4. A mold comprising male and female die members cooperating when closed to define therebetween a cavity conforming to the workpiece to be molded, one of said die members comprising a center core and side cores on opposite sides thereof, means for retracting said center core from the molded workpiece in a rectilinear path, each of said side cores having a pair of spaced-apart surfaces thereon defining said cavity in part and shaped such as to require retraction of each side core from the molded part along rectilinear paths inclined at an acute angle toward and in the direction of the retraction path of travel of said center core, means between the faces of the side cores adjacent opposite faces of the center core for slidably interconnecting said cores such that when the center core is retracted said side cores shift inwardly toward each other, a pair of support members one adjacent each of said side cores and each having a guide surface thereon inclined at said acute angle toward and in the direction of the retraction path of travel of said center core, said side cores each having a surface portion slidably engaging the guide surfaces of said support member such that when the center core is retracted each of said side cores is constrained by the guide surfaces of the support members to retract along a path disposed at said acute angle to the retraction path of travel of the center core.

(References on following page)

References Cited

UNITED STATES PATENTS

| | | |
|---|---|---|
| 765,349 | 7/1904 | Wilson. |
| 795,518 | 7/1905 | Lamp. |
| 1,589,913 | 6/1926 | Wells. |
| 2,676,372 | 4/1954 | Venner et al. _____ 249—180 |
| 2,942,319 | 6/1960 | Anthony. |
| 3,283,373 | 11/1966 | Kiefer et al. _____ 18—42 X |

FOREIGN PATENTS

| | | |
|---|---|---|
| 1,080,648 | 6/1954 | France. |
| 1,344,185 | 10/1963 | France. |
| 1,351,065 | 12/1963 | France. |
| 175,650 | 6/1961 | Sweden. |

J. HOWARD FLINT, Jr., *Primary Examiner.*